United States Patent [19]

Iuchi

[11] 4,144,006

[45] Mar. 13, 1979

[54] METAL MOLD FOR VULCANIZATION OF TIRES

[75] Inventor: Munenori Iuchi, Kobe, Japan

[73] Assignee: Sumitomo Rubber Industries, Ltd., Kobe, Japan

[21] Appl. No.: 879,422

[22] Filed: Feb. 21, 1978

[30] Foreign Application Priority Data

Feb. 21, 1977 [JP] Japan .................................. 52-18376

[51] Int. Cl.² ............................................. B29H 5/02
[52] U.S. Cl. ........................................ 425/33; 425/47; 425/43
[58] Field of Search ...................... 425/33, 35, 32, 36, 425/46, 47, 28 R, 43

[56] References Cited

U.S. PATENT DOCUMENTS

| | | | |
|---|---|---|---|
| 3,887,313 | 6/1975 | Jaedicke | 425/33 X |
| 3,890,073 | 6/1975 | Getz | 425/33 X |
| 4,068,989 | 1/1978 | Cantarutti | 425/33 X |

*Primary Examiner*—J. Howard Flint, Jr.
*Attorney, Agent, or Firm*—Sughrue, Rothwell, Mion, Zinn and Macpeak

[57] ABSTRACT

An upper half of a mold for vulcanization of tires mounted on a vulcanization press machine is composed of an inner mold portion and an outer mold portion. The contacting face of the outer mold portion to the inner mold portion is tapered to allow a downward movement of the inner mold portion independent of the outer mold portion. With the downward movement of the inner mold portion, the tire is easily separated from the outer mold portion due to deformation.

2 Claims, 6 Drawing Figures

METAL MOLD FOR VULCANIZATION OF TIRES

BACKGROUND OF THE INVENTION

The present invention relates to an improvement on a metal mold for vulcanization of tires.

The conventional metal mold for this purpose is shown in FIGS. 1 through 4, which illustrate, in cross section, operation stages of a vulcanization press machine for tires, which is referred to as a bagomatic press, on which a conventional metal mold is mounted. The first stage shown in FIG. 1 is a vulcanization stage in which a green tire is disposed between an upper half mold 10, a lower half mold 12, an upper bead ring 11, a lower bead ring 13 and a bladder 14 supported by the bead rings and is heated under pressure, resulting in a vulcanization tire 15.

In the second stage in FIG. 2, the press machine is opened after the vulcanization so that the upper half mold 10 secured by bolts 16 to an upper platen 17 which is, in turn, secured to a platen shaft 18 fixed to a top link 25 is separated from the tire 15. The opening and closing of the press machine is performed by lifting and lowering platen shaft 18, respectively, by means of a suitable mechanism.

In the third stage in FIG. 3, the lower bead ring 13 secured to an upper part 19 of a cylinder 20 having a piston rod 21 is moved upwardly by driving the cylinder 20 upwardly to separate the tire 15 from the lower half mold 12.

Then, in the fourth stage in FIG. 4, the piston rod 21 of the cylinder 20 is driven upwardly to push the upper bead ring 11 up to thereby stand up the bladder 14. Consequently, the bladder 14 is separated from the tire 15, allowing the latter to be removed from the press machine.

In the conventional pressing process including the four stages shown in FIGS. 1 through 4, however, there is a problem in that, in the second stage shown in FIG. 2, the tire 15 tends to be separated unexpectedly from not the upper half mold 10 but the lower half mold 12 and to move upwardly with the upward movement of the platen 17, with the probability of occurence of the latter being about 5%. In such case, the removal of the tire 15 from the upper half mold 10 is performed by manually inserting a plate between the upper half mold 10 and the tire 15 and prying it loose. This removal requires a substantial amount of labour.

In order to resolve this problem, it has been usual to put, on an inner surface of the upper half mold 10, a medium which facilitates a separation of the upper half mold 10 from the tire 15. This resolution is, however, not so effective and there is still a considerable time loss.

SUMMARY OF THE INVENTION

Therefore, an object of the present invention is to provide a metal mold for vulcanization of tires, by which the upward movement of the tire with the upper half mold is prevented from occuring.

A preferred embodiment of the present invention will be described with reference to accompaning drawings.

DETAILED DESCRIPTION OF PREFERRED EMBODIMENTS

Figure 1:
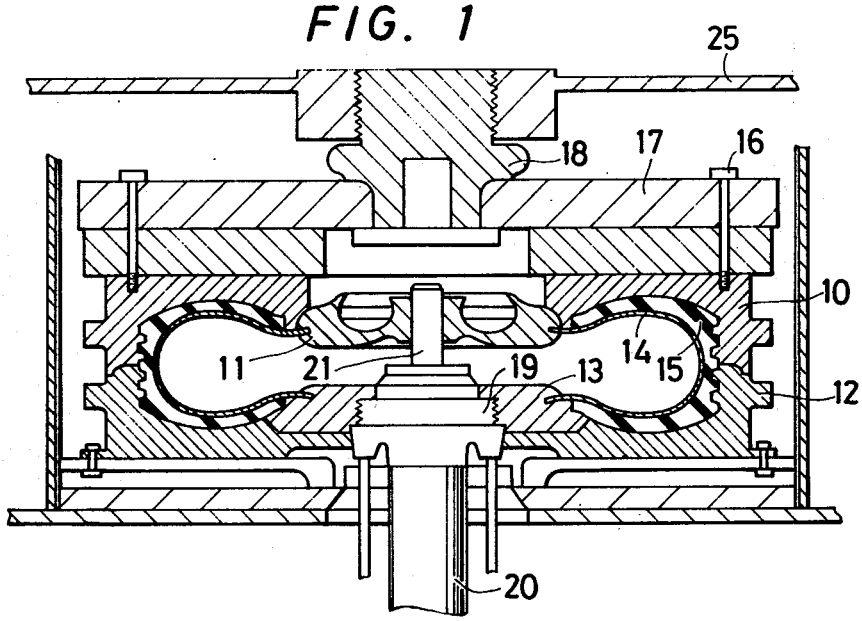
FIGS. 1 through 4 illustrate operations of the conventional mold for vulcanization of tires, which were described already.

Returning to FIGS. 5 and 6, in which similar components to those in FIG. 1 are depicted by similar reference numerals, a combination of an inner mold portion 10a and an outer mold portion 10b corresponds substantially to the upper half mold 10 in FIG. 1. A contacting face 37 of the outer mold poriton 10b to the inner mold portion 10a is downwardly tapered to allow a downward movement of the inner mold portion 10a independent of the outer mold portion 10b which is secured to a platen 17 as in the conventional machine.

The inner mold portion 10b is provided with a connecting portion 36 through which it is secured to a downward driving mechanism. The downward driving mechanism is constituted with a piston rod 22 which has a lower end to which the connecting portion 16 of the inner mold portion 10b is secured and is extendable through the upper platen 7, and a cylinder 24 therefor fixedly disposed on the top link 25 of the press machine.

The cylinder 24 and the piston rod 22 may be of any type which is usable to open and close and ordinary segmental mold.

Figure 5:
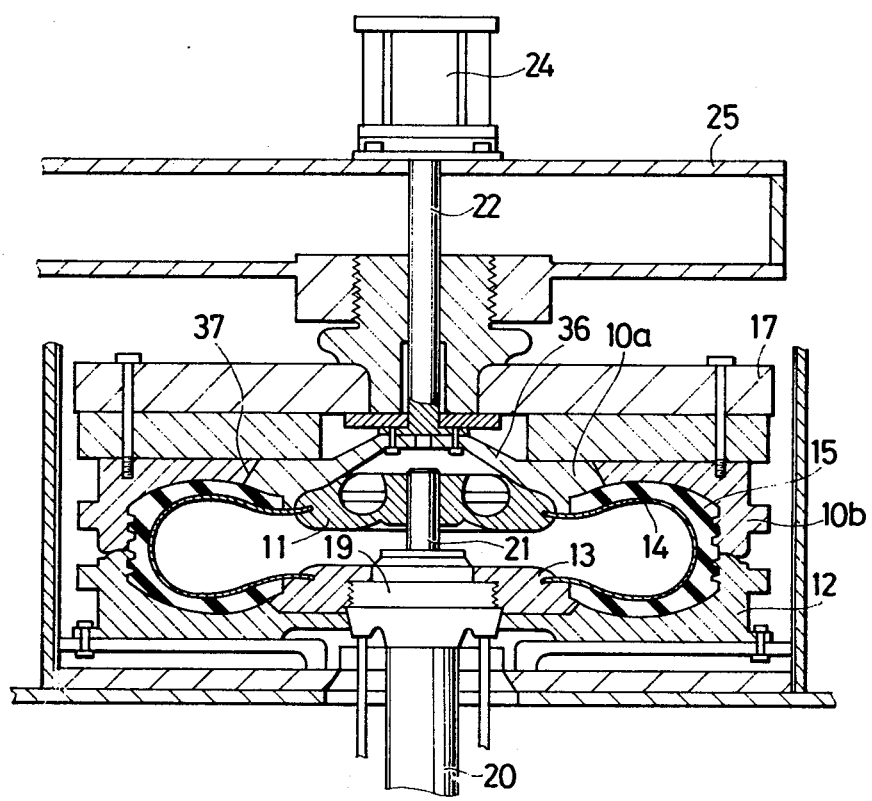
FIG. 5 shows, in cross section, a press machine in a vulcanization stage, which has an embodiment of the present invention.

Other portions of the press machine in FIG. 5 are identical to those of the conventional machine shown in FIG. 1.

Figure 6:
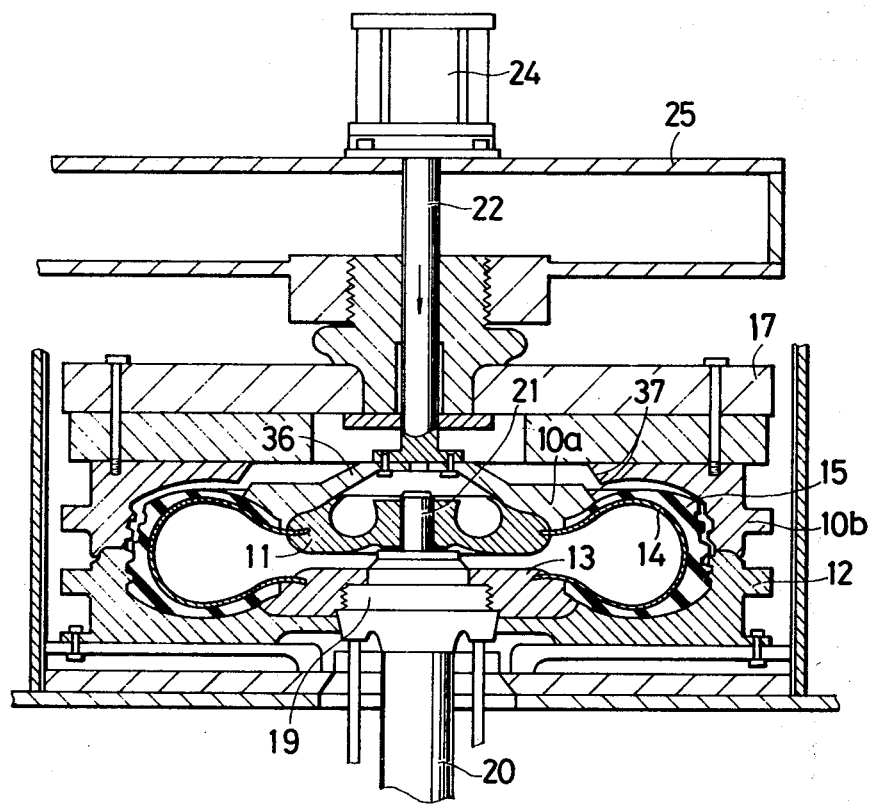
FIG. 6 shown, in cross section, the machine in FIG. 5 in a stage by which the vulcanization tire is removed from the machine.

In operation, after the vulcanization of the tire is completed, the cylinder 24 is actuated to extend the piston rod 22 downwardly to thereby push the inner mold portion 10a downwardly, so that the bladder 14 and the tire 15 are deformed as shown in FIG. 6. With this deformation, the tire 15 is separated from the outer mold portion 10b, as shown.

Figure 2:
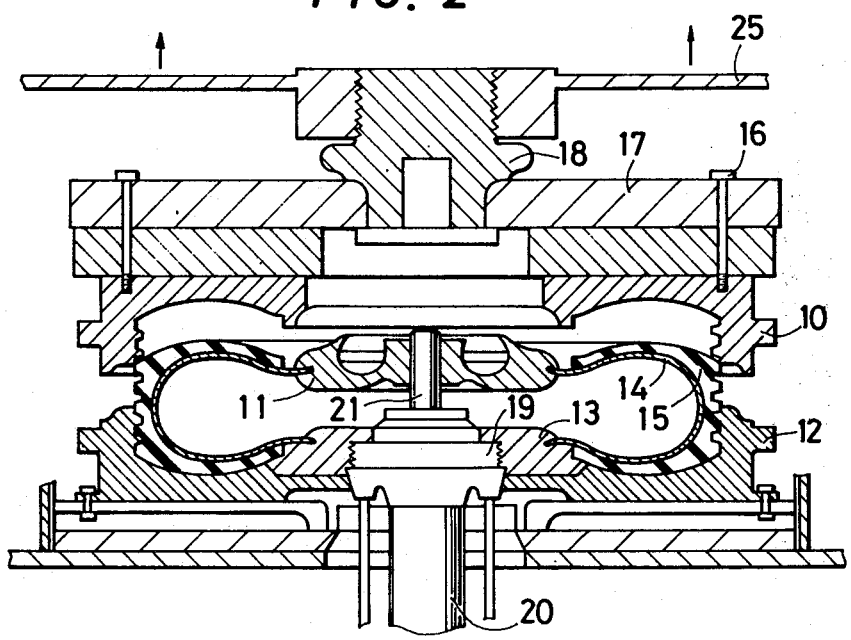

Then the press machine is opened by driving the top link 25 upwardly in the same manner as shown in FIG. 2, with the positional relation between the inner and the outer mold portions unchanged.

Figure 3:
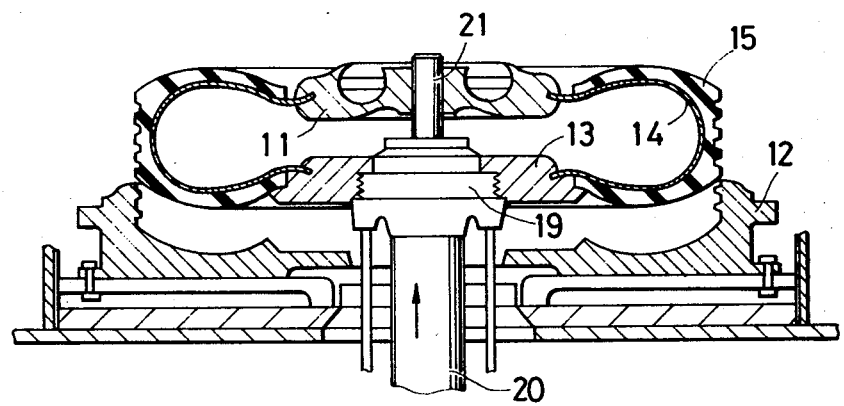
Figure 4:
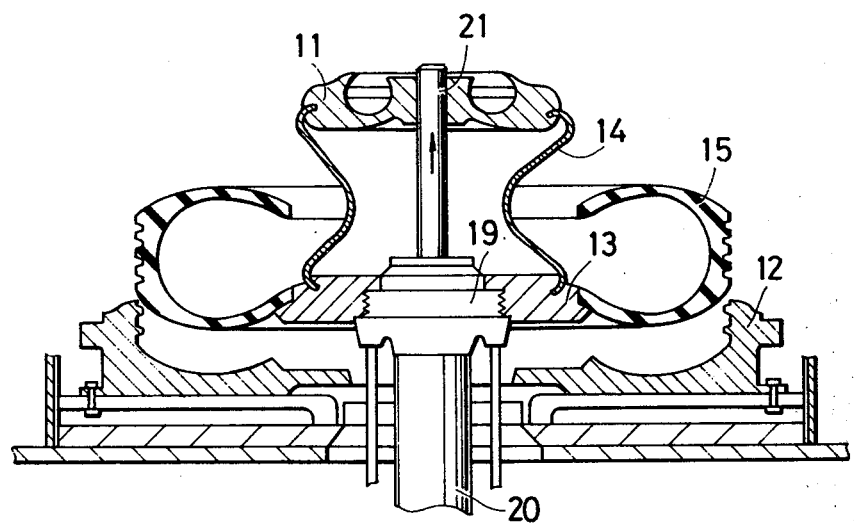

The separation of the tire 15 from the lower half mold 12 can be performed in the same manner as shown in FIGS. 3 and 4.

With the metal mold for vulcanization of tires according to the present invention, the tire can be reliably separated from the upper mold portions 10a and 10b. Therefore, the disadvantage of the conventional separation of a tire from the mold can be completely eliminated, causing a remarkable improvement in efficiency. In addition to this fact, since there is no need to provide tire separating agent on the inner surface of the upper half mold, the producibility of tire can be improved by about 10% in comparison with the conventional production.

It should be noted that the present invention can be applied to vulcanization of a radial tire which has been recognized as being not separated from a mold unless the latter is of eight-segment type. That is, with the division of the upper half mold into an inner mold portion and an outer mold portion according to the present invention, there is almost no need of using an eight-segment type mold, resulting in a remarkable reduction of cost of the mold.

Summing up the above mentioned advantages of the present invention over the prior technique, it becomes possible to reduce the manufacturing cost of tires for trucks and buses by about ¥ 800 for each tire.

In addition to the above, since the mold of the present invention can be substantially small in outer diameter in comparison with the conventional eight-segment mold, the size of the press machine on which the mold is mounted can be much smaller than that mounting the eight-segment mold.

As mentioned hereinbefore, the present invention provides a metal mold for vulcanization of a tire which can be applied not only to the usual tire but also to the radial tire with remarkable effects on the reduction of manufacturing cost and the improvement on the producibility.

What is claimed is:

1. In a metal mold for vulcanization of a tire, to be mounted on a press machine of the type having a base, a vertically movable cylinder having a piston rod, a vertically movable top link and an upper platen connected to said top link, said vulcanization mold including an upper half mold having peripheral portion secured to said upper platen, a lower half mold, an upper bead ring secured to an end of said piston rod, a lower bead ring secured to an end of said cylinder and a bladder supported between said bead rings, an improvement characterized by said upper half being composed of coaxially arranged inner and outer mold portions, a contacting face of said inner mold portion to said outer mold portion being tapered downwardly so as to allow a downward movement of said inner mold portion independent of said outer mold portion, said inner mold portion being provided with a connecting portion to which a driving member for selectively driving said inner mold portion is secured.

2. A metal mold for vulcanization of a tire as claimed in claim 1, wherein said driving member is a piston rod extendable vertically from a cylinder mounted on said top link of said press machine.

* * * * *